Feb. 23, 1937.　　　　　P. NEUBERT　　　　　2,071,471
DEVICE FOR INDICATING THE TEMPERATURE DISTRIBUTION OF HOT BODIES
Filed Feb. 2, 1933
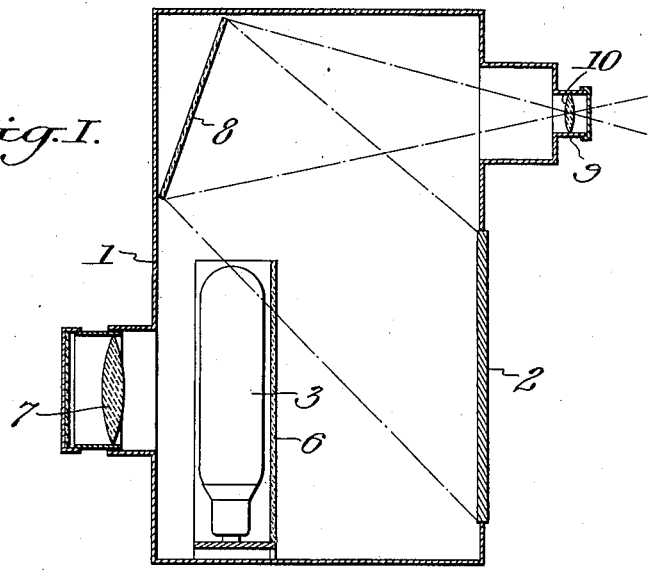
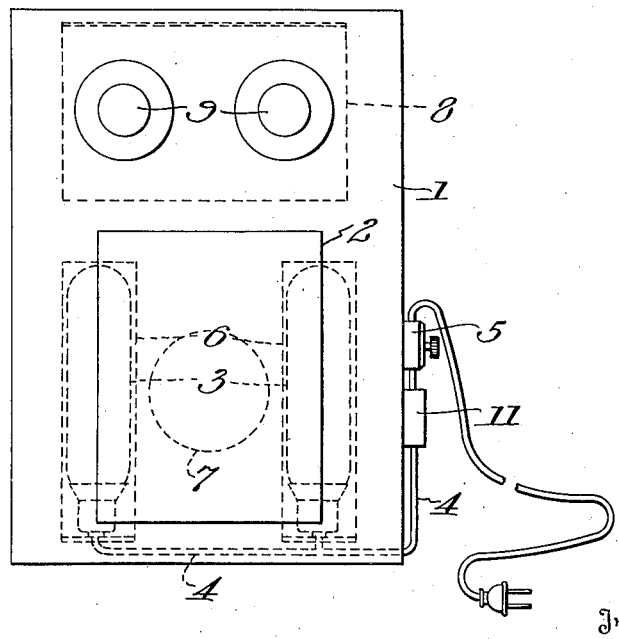

Patented Feb. 23, 1937

2,071,471

UNITED STATES PATENT OFFICE 2,071,471

DEVICE FOR INDICATING THE TEMPERATURE DISTRIBUTION OF HOT BODIES

Paul Neubert, Leverkusen-I. G. Werk, Germany, assignor to I. G. Farbenindustrie Aktiengesellschaft, Frankfort-on-the-Main, Germany Application February 2, 1933, Serial No. 654,952
In Germany February 8, 1932

2 Claims. (Cl. 88—14)

This invention relates to a device for indicating or recording by visible means the temperature of hot bodies which do not glow or only do so to a slight extent and to the production of photographic temperature records.

It is known that hot bodies which no longer appear luminous to the eye can be photographed with plates sensitized with special dyestuffs and the temperature distribution ascertained by a special process. This photographic method necessitates, however, even at temperatures just below 400° C., rather long exposures of two or more hours, and even if the plates are supersensitized by means of ammonia, which requires a certain practice the exposure is only shortened at most by half.

It is, however, also known that the luminescence of luminous paints (consisting mainly of metal sulfides containing quite small quantities of heavy metals) excited by means of blue or ultra violet light is extinguished by infra red radiation, that is by heat radiation. This property has been applied to render visible infra red lines of the spectrum.

The present invention makes use of this known phenomenon of the extinguishing of the radiation of excited phosphorescent luminous paints to shorten the disadvantageously long exposure.

In accordance with the present invention temperature distribution on the surfaces of hot solid objects, which, however, no longer appear luminous to the eye or only slightly so, having a temperature ranging from about 300° to about 500° C., is rendered visible in a simple manner and in a relatively very short time without the special manipulation of plates and developing by employing the known principle of rendering visible heat radiation by projecting the rays from the hot object on excited luminous paint. The extinguishing takes place most strongly at those points of the screen corresponding to the hottest parts of the object with the result that the luminous paint appears black or grey against the surrounding phosphorescent luminous paint upon which the heat radiation has not impinged.

It has been established that the degree of the extinguishing of the luminescence caused by the heat radiation is approximately proportional to the temperature and that consequently the distribution of blackness yields an approximate picture of the temperature distribution. For the production of such a picture a surface coated with a luminous paint, for example, a specially suitable sidot blende (zinc sulfide with a small addition of copper) is excited for some minutes by means of blue or ultra violet light to the extent that it shines brightly whereupon for example the heat radiation of a hot object, which, however, no longer appears luminous to the eye, is projected upon it through a strong lens, the heat radiation being allowed to act for 2–3 minutes. On examining the surface a dark colored picture is then observed on a bright background, the blackness of which increases with the temperature of the individual points on the surface of the object projected with the result that the points of high or lower temperature can be recognized at once. By varying the time of the exposure the blackening can be adjusted to the temperature of the object to be projected.

It has further been established that after the extinguishing effect of the luminescent effect the blackened picture of the hot object can also be fixed photographically, for instance, by contact printing, whereby a bright positive picture is produced on a dark background. By repeating the above process still lower temperatures can be visibly recorded than is possible by simple observation. By employing a red or infra-red filter the process can also take place in diffused daylight by employing an appropriate camera.

In the accompanying drawing Figure I represents a longitudinal section, and Figure II the rear of the apparatus required for carrying out the process.

A case (1) being tight against light is provided with a plate (2) covered with a luminous paint. On the opposite side of the case there are two incandescent lamps (3) which are connected by a circuit (4) with a switch (5) and the both ends of which may be attached to any desired electric contact. The incandescent lamps are screened off by blue-violet filters (6), so that only blue-violet rays can excite the luminous paint on plate (2). The wall opposite plate (2) contains between the screened off incandescent lamps an adjustable lens (7) transmitting much light, whereby a picture of the hot object to be examined is optically produced on the luminous paint. Above the lens there is a mirror (8), and in the wall being opposite this mirror, that is above plate (2), there are two openings (9), which may be provided with weakly enlarging lenses (10), so that in this manner the change of the luminous screen 2 may be observed. Within the circuit of the lamps there is a regulating resistance (11) for regulating the luminosity of the incandescent lamps (3).

The apparatus works in such a manner that first the luminous paint on plate 2 is strongly excited while fully switching in the incandescent lamps (3). After the luminous screen has been sufficiently excited the lens is focused and an image of the hot object to be examined is optically projected onto the screen. According to the extinction of the excited luminous paint taking place by the heat rays the picture, more or less blackened, can be observed on plate 2 through the openings (9). The picture on plate 2 will by and by become more black the more the excitement of the luminous paint disappears. In order to obtain a picture which is longer visible it is necessary to switch in the lamps again but their luminosity is so weakened by the regulating resistance (11) that the new excitement corresponds to the extinguishing of the luminous paint, so that a picture of permanently even luminosity is obtained.

I claim:

1. Process of determining temperature distribution over the surface of a solid body having temperatures ranging from about 300° to about 500° C., which comprises exciting a phosphorescent screen by directing thereon blue or ultra violet radiation until the screen glows, optically collecting infra red radiation from the hot body and projecting the same to form a real image of the surface of the body on said excited phosphorescent screen for a sufficiently extended period to extinguish phosphorescence in areas of the screen approximately proportionally to the temperature distribution in the hot body, thus producing on the screen a dark image, of substantial size, of the hot body against a glowing background, and observing the resulting image.

2. Apparatus for rendering visible temperature distribution over the surface of a solid body having temperatures ranging from about 300° to about 500° C., which comprises a light-tight box, an opening in the box, a collecting lens positioned in said opening, a screen coated with a luminous paint of the type excitable by blue or ultra violet light and supported within the box on the wall opposite to said opening, means for transmitting blue or ultra violet light to said screen, a second opening in the box in the top portion of the wall on which the screen is supported, a viewing lens positioned in said second opening, and in the top portion of the box a mirror so positioned and supported that said screen may be viewed through said viewing lens.

PAUL NEUBERT.